W. RENNIE.
TROLLEY.
APPLICATION FILED APR. 22, 1919.
1,364,208.
Patented Jan. 4, 1921.
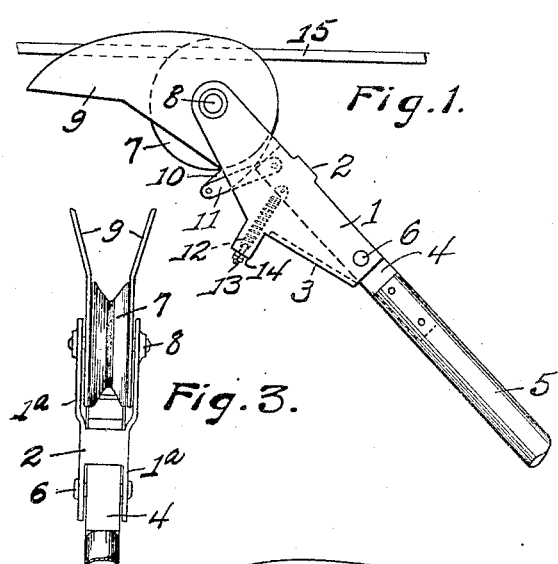
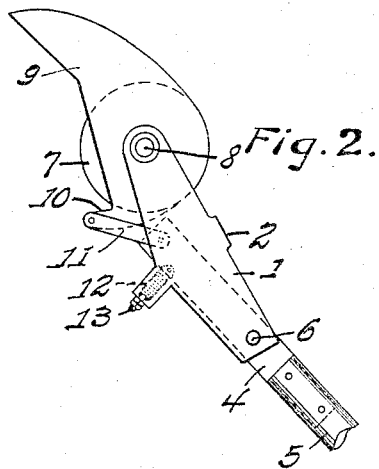
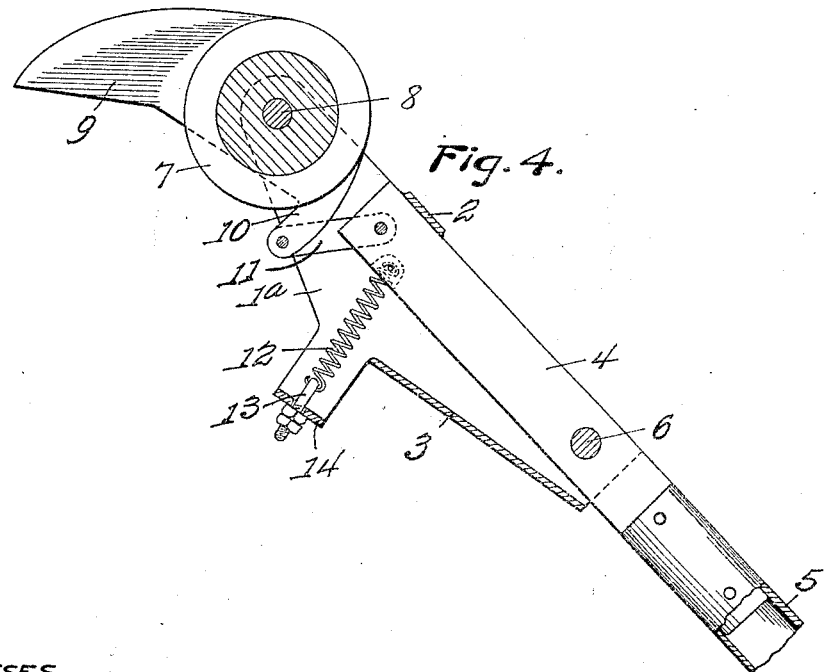
WITNESSES.
W. B. Erskine
A. L. Dunlap
INVENTOR.
William Rennie
BY N. E. Dunlap
ATTORNEY.

UNITED STATES PATENT OFFICE.

WILLIAM RENNIE, OF SHADYSIDE, OHIO.

TROLLEY.

1,364,208.

Specification of Letters Patent.  Patented Jan. 4, 1921.

Application filed April 22, 1919. Serial No. 291,827.

*To all whom it may concern:*

Be it known that I, WILLIAM RENNIE, a citizen of the United States of America, and resident of Shadyside, county of Belmont, and State of Ohio, have invented certain new and useful Improvements in Trolleys, of which the following is a specification.

This invention relates broadly to trolleys, and more particularly to a harp and retriever for trolleys.

The primary object of the invention is to provide a trolley harp having associated therewith positive means whereby the trolley wheel is prevented from leaving the trolley wire.

A further object is to provide, in association with a trolley wheel and harp, guard members which, when the wheel is disposed in operative relation to the trolley wire, occupy depressed positions in which they are maintained out of engagement with overhead obstructions, such as the usual wire supports, frogs and guy lines, and which, when the wheel tends to leave the wire, relieving the yielding pressure applied through the wheel to the under side of the wire, instantly move to substantially upright positions at opposite sides of the wire for preventing complete dissociation of the trolley with respect to said wire.

With these and other objects in view, the invention resides in the features of construction, arrangement of parts and combinations of elements which will hereinafter be fully described, reference being had to the accompanying drawings, in which—

Figure 1 is a side elevation of the invention, showing the parts in the positions occupied when the trolley wheel is seated against the trolley wire;

Fig. 2 is a similar view showing the guards in operative position;

Fig. 3 is a front elevation of the invention with the parts disposed in the positions shown in Fig. 2; and Fig. 4 is an enlarged longitudinal section of the invention with the parts disposed as shown in Fig. 1.

Referring to said drawings, in which like designating characters distinguish like parts throughout the several views—

1 indicates generally a trolley harp, preferably formed in one piece, comprising parallel side members 1ª which are suitably connected, as by means of upper and lower transverse members 2 and 3. Said harp is of approximately rectangular box-like formation in cross-section and has received in the lower part thereof between said side members 1ª the upper end of an arm 4 which is suitably carried by the usual trolley pole 5. Said arm 4, which is preferably rectangular in cross section, has pivotal connection through a pivot-pin 6 with said harp at a point adjacent to the lower end of the latter.

Journaled on the upper ends of the members 1ª of the harp is the trolley wheel 7, and pivotally mounted on the axle 8 between each of the opposite sides of said wheel and the adjacent member 1ª is a guard member 9 of approximately triangular or wing shape, as shown. A short downwardly and rearwardly inclined lever arm 10 carried by the lower end of each guard member 9 has its outer end pivotally connected to one end of a link 11 which is pivotally connected at its opposite end to the upper end of the arm 4.

Connected to said arm 4 adjacent to the upper end thereof is the upper end of a retractile coil spring 12 which has its lower end attached to an adjustable bolt 13, or equivalent device, mounted in a suitably located transverse wall 14 of the harp 1. Said spring 12 tends to hold the harp swung on the pivot-pin 6 in a position wherein it is upwardly inclined with respect to the arm 4 and pole 5, as shown in Figs. 2 and 3. In such relative positions of the harp 1 and arm 4, the guard members 9 are held in upwardly swung positions on opposite sides of the trolley wire 15 for preventing the trolley wheel from leaving such wire.

The wheel 7 is normally held by the pole 5 in engagement with the trolley wire 15 under such applied force that the harp 1 is swung downward on its pivotal mounting 6 against the tension of the spring 12, substantially as shown in Figs. 1 and 4. In such relative positions of the harp and arm 4, the guard members 9 are actuated through the intermediate link 11 and lever arm 10 to the reclining position shown in said Figs. 1 and 4 in which they project little, if any, above the plane of the upper edge of the wheel 7. Obviously, however, as the pressure of the wheel against the wire decreases, as when the wheel tends through any cause whatsoever to leave, or to become disengaged from, the wire, the tension of the spring 12 acts to instantly elevate the outer end of the harp and, consequently, to swing the guard members to their upright guarding positions for retaining the wheel in normal relation to the wire.

The wall 14 in which is mounted the adjustable bolt 13 is located at such a distance below the lowermost swung position which the arm 4 may occupy in the harp 1 that the spring 12 may be fully accommodated in the intervening space, said wall constituting in effect the bottom of a spring-receiving pocket.

What I claim is—

1. In a trolley, the combination with a trolley pole, of a harp pivotally connected to said pole, resilient means normally holding said harp in an elevated approximately upright position out of alinement with said pole, a trolley wheel carried by said harp, guards pivotally mounted at opposite sides of said wheel, each guard having a fixed downwardly and rearwardly inclined arm at its lower end, and means including links arranged intermediate said arms and said pole whereby said guards are actuated to move to upstanding operative positions as the harp moves to elevated position, and vice versa, the normal pressure under which said wheel is held to the trolley wire serving to maintain said harp and said guards depressed against the tension of said resilient means.

2. In a trolley, the combination with a trolley pole, of a member rigidly carried in alinement with the pole at the upper end of the latter, a harp of box-like form within which said member is received, said harp having pivotal connection at its lower end with the lower end of said member and being capable of swinging movement downward into and upward out of approximate alinement with said pole, a trolley wheel carried by the upper end of said harp, guards mounted at opposite sides of said wheel, each guard having an arm, a link pivotally connecting said arm to the free end of said member, and a spring interposed between the under side of said member and the under portion of the box-like harp and tending to maintain said harp in its elevated position and also tending through the links to hold said guards elevated in operative positions, the tension of said spring being normally overcome by the pressure-exerting force applied by the pole to the trolley wire through said harp and said trolley wheel.

In testimony whereof, I affix my signature.

WM. RENNIE.